(12) United States Patent
Imai et al.

(10) Patent No.: US 6,578,426 B2
(45) Date of Patent: Jun. 17, 2003

(54) PRESSURE SENSOR HAVING SEMICONDUCTOR SENSOR CHIP

(75) Inventors: Masahito Imai, Chita (JP); Takeshi Shinoda, Kariya (JP); Yasutoshi Suzuki, Okazaki (JP); Hiroaki Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/987,349

(22) Filed: Nov. 14, 2001

(65) Prior Publication Data

US 2002/0078755 A1 Jun. 27, 2002

(30) Foreign Application Priority Data

Dec. 25, 2000 (JP) ........................................ 2000-392792

(51) Int. Cl.⁷ ................................................ G01L 9/04
(52) U.S. Cl. .............................. 73/720; 73/717; 73/715
(58) Field of Search .......................... 73/717, 727, 754, 73/718, 728, 715, 721, 706

(56) References Cited

U.S. PATENT DOCUMENTS 4,771,639 A * 9/1988 Saigusa et al. ............... 73/727

6,176,137 B1 * 1/2001 Sasaki et al. ................. 73/754

FOREIGN PATENT DOCUMENTS

| DE | 19843471 | 5/1999 |
| JP | A-53-54992 | 5/1978 |
| JP | A-10-78363 | 3/1998 |
| JP | A-2000-2421273 | 8/2000 |

\* cited by examiner

*Primary Examiner*—Hezron Williams
*Assistant Examiner*—Jermaine Jenkins
(74) *Attorney, Agent, or Firm*—Posz & Bethards, PLC (57) ABSTRACT

A semiconductor sensor chip mounted on a thin diaphragm of a cylindrical metallic stem via an insulation layer is hermetically contained in a housing of a pressure sensor. The sensor chip includes a strain gage for outputting an electrical signal according to distortion of the diaphragm caused by pressure to be measured. A shield layer is interposed between the insulation layer and the sensor chip, and the shield layer is grounded. Influence of outside noises on the sensor outputs is eliminated or suppressed by the grounded shield layer even if the outside noises are in a high frequency region.

5 Claims, 8 Drawing Sheets

PRESSURE SENSOR HAVING SEMICONDUCTOR SENSOR CHIP

CROSS-REFERENCE TO RELATED APPLICATION

This application is based upon and claims benefit of priority of Japanese Patent Application No. 2000-392792 filed on Dec. 25, 2000, the content of which is incorporated herein by reference.

BACKGROUND OF THE INVENTION

1. Field of the Invention

The present invention relates to a pressure sensor having a semiconductor sensor chip for converting a strain of a diaphragm sensing a pressure applied thereto into an electrical signal.

2. Description of Related Art

Figure 11:
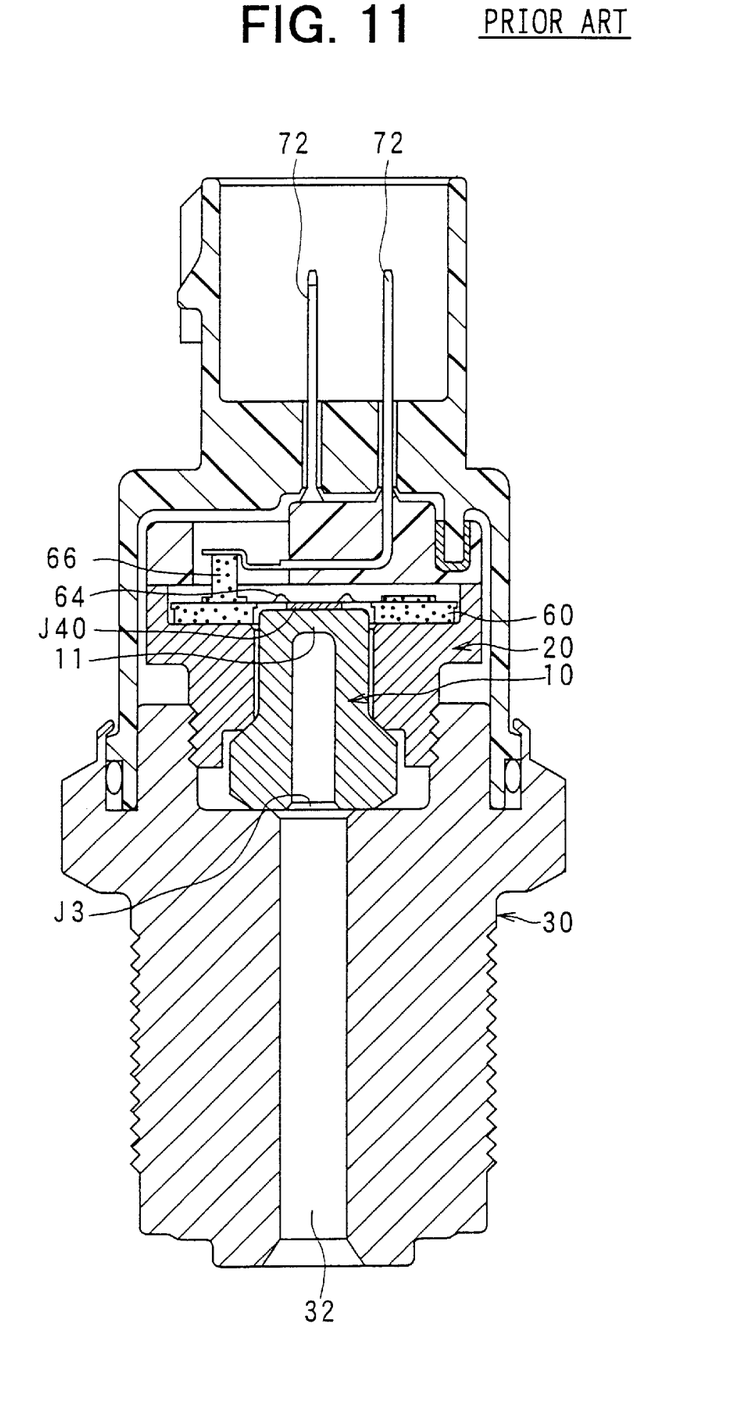
FIG. 11 is a cross-sectional view showing a conventional pressure sensor.

An example of conventional pressure sensors of this kind is shown in FIG. 11. FIG. 11 shows a cross-sectional view of a pressure sensor used for detecting a high fuel pressure in a fuel injection system (e.g., in a common rail injection system) of an automobile. A metallic stem 10 having a diaphragm 11 for sensing a pressure applied thereto is contained in a housing 30. The metallic stem 10 is fixed to the housing 30 by a mounting block 20, and the diaphragm 11 is distorted by a pressure introduced through a pressure-introducing passage 32.

Figure 12:
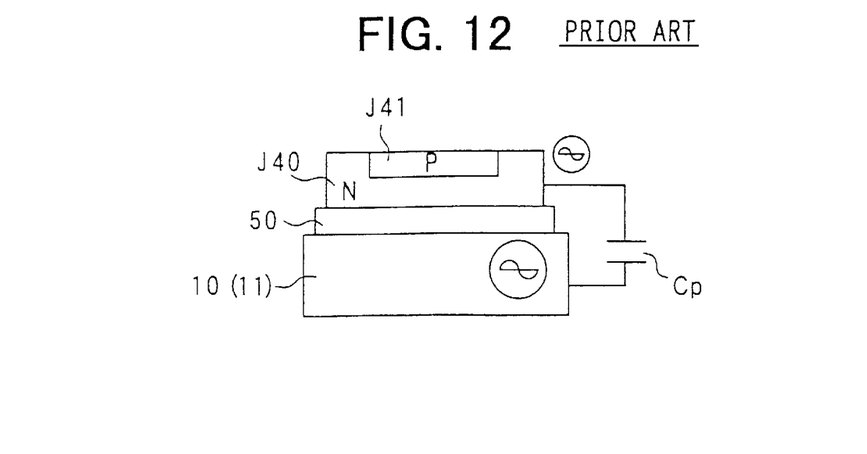
FIG. 12 is a schematic view showing a sensor chip used in the conventional pressure sensor shown in FIG. 11.

FIG. 12 schematically shows a vicinity of the diaphragm 11 shown in FIG. 11 in an enlarged scale. A semiconductor sensor chip J40 is mounted on a front surface of the diaphragm 11 via an insulation film 50 made of glass having a low melting point such as silicon oxides. A strain gage J41 formed on the sensor chip J40 converts diaphragm distortion caused by a pressure applied thereto into an electrical signal. The strain gage J41 is made of a P-type region formed on the front surface of an N-type silicon substrate.

As shown in FIG. 11, a circuit substrate 60 is disposed around the sensor chip J40, and the sensor chip J40 is electrically connected to the circuit substrate 60 by bonding wires 64. The circuit substrate 60 is electrically connected to terminals 72 through a pin 66. In this pressure sensor, the diaphragm 11 is distorted by the pressure introduced through the pressure-introducing passage 32. The diaphragm distortion is converted into an electrical signal by the strain gage J41 formed on the sensor chip J40. The electrical signal is fed to an outside circuit such as an electronic control unit of an automobile through the bonding wires 64, the circuit substrate 60, the pin 66 and the terminals 72.

Since the sensor chip J40 is fixed on the front surface of the diaphragm 11 of the metallic stem 10 via the insulation film 50 as shown in FIG. 12, a parasitic capacitance Cp is formed between the metallic stem 10 and the sensor chip J40. In the parasitic capacitance Cp, both the metallic stem 10 and the sensor chip J40 serve as electrodes, and the insulation film 50 serves as a dielectric layer.

The parasitic capacitance Cp causes the following problem when the pressure sensor is used in an atmosphere under high electromagnetic noises. Such electromagnetic noises are generated, for example, by wireless communication devices. An electric current caused by electromagnetic noises (for example, 1 MHz to 1,000 MHz; several volts to 200 volts/m) is transferred from the housing 30 to the strain gage J41 through the metallic stem 10, the parasitic capacitance Cp and the sensor chip J40. This noise current is added to an output signal of the strain gage J41 and is amplified through a signal processor circuit, decreasing a signal-noise ratio (S/N ratio) in the sensor signal or causing malfunction in the system in which the pressure sensor is used.

SUMMARY OF THE INVENTION

The present invention has been made in view of the above-mentioned problem, and an object of the present invention is to provide an improved pressure sensor in which influence of outside noises on the sensor signal is eliminated or suppressed.

A pressure sensor for detecting a pressure such as a fuel pressure in an automotive injection system includes a metallic stem to which the pressure to be detected is introduced, a semiconductor sensor chip outputting an electrical signal representing the detected pressure, and an electrical circuit for processing the sensor signal. Those components of the pressure sensor are hermetically contained in a housing. The metallic stem has a thin diaphragm that distorts according to the pressure imposed on the rear surface thereof. The sensor chip is mounted on the front surface of the diaphragm via an insulation layer.

The sensor chip is made of a silicon semiconductor chip having a P-type conduction layer and an N-type conduction layer laminated on the P-type conduction layer. The sensor chip is mounted on the front surface of the diaphragm so that the P-type conduction layer contacts the insulation layer. A P-type conduction region is formed in the N-type conduction layer so that the P-type conduction region is electrically separated from the P-type conduction layer. The P-type region formed in the N-type layer constitutes a strain gage, the resistance of which changes according to distortion of the diaphragm. The electrical signal outputted from the strain gage is processed by the electrical circuits connected to the strain gage.

The P-type conduction layer of the sensor chip functions as a shield layer for interrupting outside noises from the strain gage. Preferably, a pad for grounding the shield layer and another pad for grounding the strain gage are provided separately from each other, and both pads are grounded through respective circuits formed separately from each other. By separately grounding the shield layer, the outside noises are effectively interrupted, and the sensor outputs are kept free from the outside noises even the outside noises are in a high frequency region.

The positions of the N-type and the P-type conduction layers in the sensor chip may be reversed so that the N-type layer becomes a base layer and the P-type layer is laminated on the N-type layer. The strain gage may be composed of four strain gage elements forming a bridge circuit.

According to the present invention, outside noises are effectively separated from the sensor outputs by the insulation layer disposed between the strain gage and the metallic stem from which the outside noises are transferred.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to FIGS. 1–9B. First, referring to FIGS. 1 and 2, an entire structure of a pressure sensor S1 will be described. The pressure sensor S1 is mounted, for example, on a fuel pipe in a fuel injection system such as a common rail system for an automotive vehicle and detects a pressure of liquid fuel or a mixture of liquid and vapor fuel in the fuel pipe.

Figure 1:
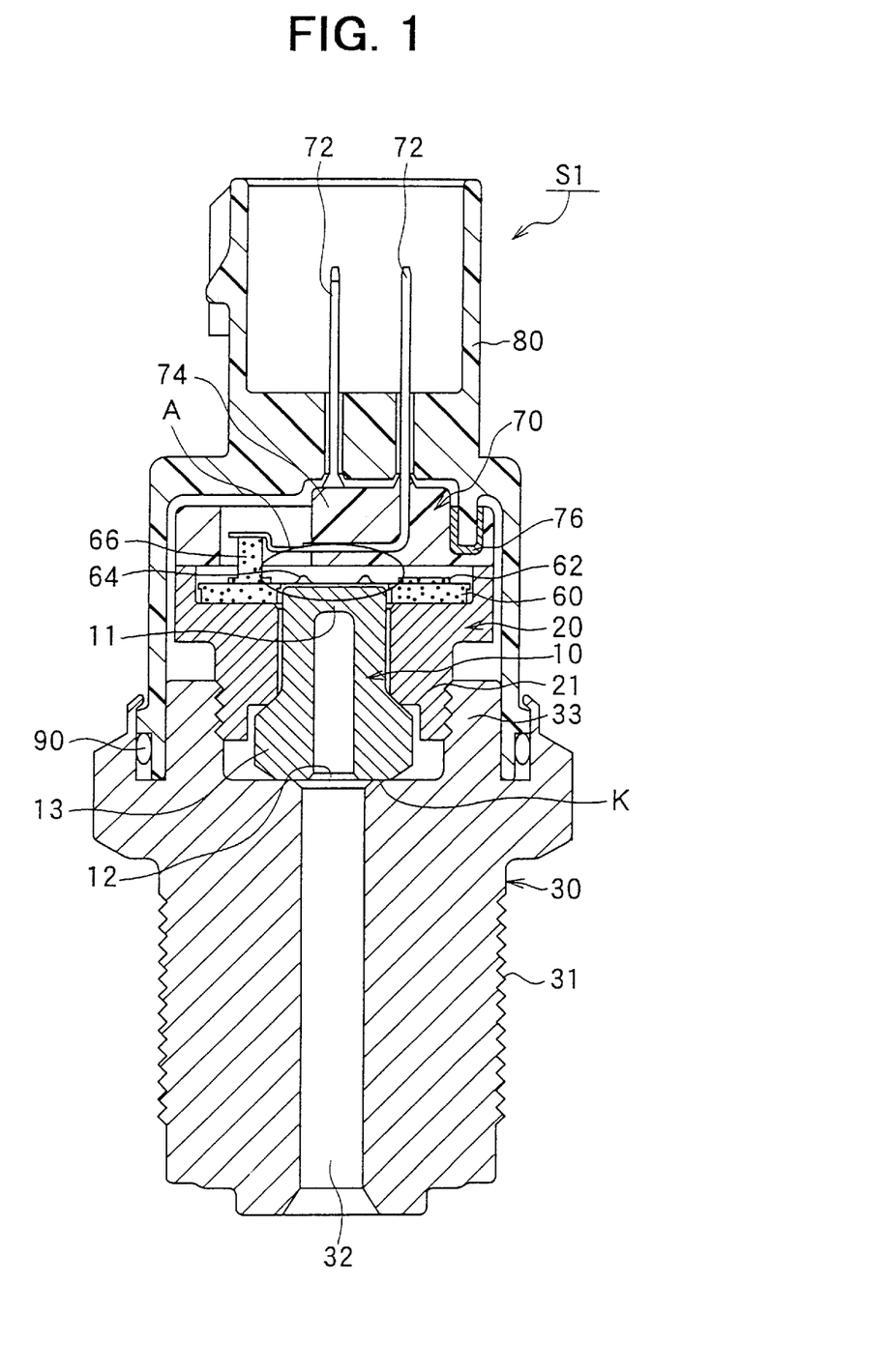
FIG. 1 is a cross-sectional view showing an entire structure of a pressure sensor according to the present invention.
Figure 2:
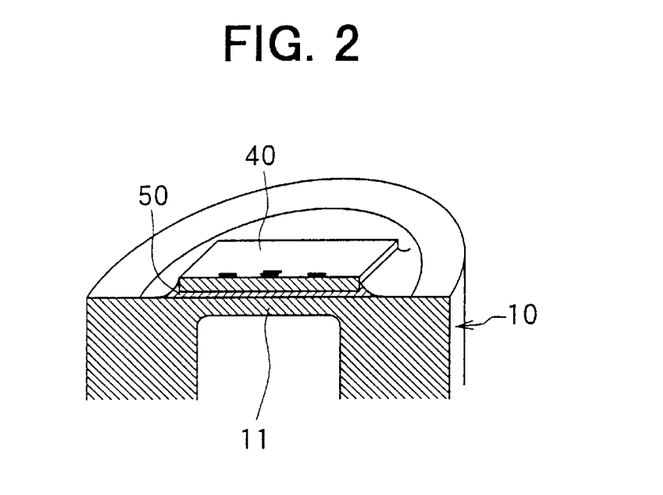
FIG. 2 is a perspective view showing a sensor chip and its vicinity, which is encircled by circle A in FIG. 1.

A cylindrical hollow metallic stem 10 is fixed to a housing 30 with a mounting block 20. The metallic stem 10 includes a thin diaphragm 11 formed at its upper end and an opening 12 formed at its bottom end. An enlarged portion 13 is formed at a position close to the bottom opening 12. A semiconductor sensor chip 40 is mounted on the front surface of the diaphragm 11 via an insulation layer 50 made of low-melting-point glass or the like, as shown in FIG. 2. The sensor chip 40 detects a strain of the diaphragm distortion caused by a pressure introduced into the metallic stem 10. A strain gage 41 (refer to FIG. 3) formed on the sensor chip 40 converts the strain of the diaphragm 11 into an electrical signal.

It is required that the metallic stem 10 has a high mechanical strength because it receives a very high pressure and has a low thermal expansion coefficient because the sensor chip 40 made of silicon is connected to the metallic stem 10 with the insulation layer 50 made of glass or the like. Therefore, as a material of the metallic stem 10, such a material composed of Fe, Ni and Co, or Fe and Ni as a main material, to which Ti, Nb and Al, or Ti and Nb as additives for strengthening precipitation are added, is selected. The metallic stem 10 may be formed by presswork, machining or cold forging.

The housing 30 having a peripheral screw 31 is directly fixed to a fuel pipe by screwing. A pressure-introducing passage 32 communicating with the opening 12 of the metallic stem 10 is formed in the center of the housing 30. A pressure medium such as fuel is introduced into the metallic stem 10 through the pressure-introducing passage 32.

The mounting block 20 is cylinder-shaped and disposed outside the metallic stem 10. A male screw 21 is formed on the outer periphery of the mounting block 20, and a female screw 33 is formed on the inner bore of the housing 30. By screwing the mounting block 20 into the housing 30, a downward pressure is applied to the metallic stem 10 via a tapered portion formed on the enlarged portion 13 of the metallic stem 10. The bottom surface of the metallic stem 10 closely contacts the housing 30 and is firmly fixed thereto by the downward pressure. Thus, the boundary surface K between the bottom surface of the metallic stem 10 and the upper surface of the housing 30 is hermetically sealed. The pressure-introducing passage 32 and the opening 12 of the metallic stem 10 are tightly connected not to cause leakage along the boundary surface K.

The metallic stem 10 is fixed to the housing 30 by screwing the mounting block 20, and a connector case 80 is connected to the housing 30 by caulking an upper lip of the housing 30, and further, the housing 30 itself is mounted on the fuel pipe directly screwing its screw 31. Therefore, the housing 30 must have an anti-corrosive strength against a pressure medium such as fuel and environmental conditions of actual use of an automotive vehicle. Further, the housing 30 must have a sufficient screw strength to generate an axial force for securing the tight sealing on the boundary surface K. To satisfy these requirements, the housing 30 is made of carbon steel (e.g., S15C) having anti-corrosive and mechanical strength, and Zn plating is applied to the housing 30 to further improve the anti-corrosive property. Alternatively, XM7, SUS430, SUS304, SUS630 or the like having an anti-corrosive property may be used as a material of the housing 30.

It is also required that the mounting block 20 has a high mechanical strength to fix the metallic stem 10 to the housing 30 with a high sealing pressure on the boundary surface K. However, the anti-corrosive property is not required to the mounting block 20 because it is contained in a space formed by the housing 30 and the connector case 80. Therefore, the mounting block 20 may be made of carbon steel.

A ceramic substrate 60 carrying an IC-chip 62 thereon is fixed to the upper surface of the mounting block 20 and disposed around the sensor chip 40. The IC-chip 62 is pasted on the ceramic substrate 60 and electrically connected thereto with bonding wires. The sensor chip 40 is electrically connected to the ceramic substrate 60 through bonding wires 64 made of aluminum or the like. The bonding wires 64 are formed by a ultrasonic wire bonding method. A pin 66 for electrically connecting the ceramic substrate 60 to a connector terminal 70 is fixed to the ceramic substrate 60 with silver solder.

The connector terminal 70 is formed by molding a resin material 74 together with terminals 72 inserted therein. The terminals 72 are electrically connected to the pin 66 by laser welding. Outputs from the sensor chip 40 are led to the terminals 72 through the bonding wires 64 and the pin 66. The connecter terminal 70 is fixed to the connector case 80 with adhesive 76, and the terminals 72 are connectable to an outside device such as an automotive ECU through outside wires. Though only two terminals 72 are shown in FIG. 1, at least three terminals 72 are necessary: an input terminal for supplying a voltage to the sensor chip 40, an output terminal for taking out outputs of the sensor chip 40 and a ground terminal for grounding the sensor chip 40 and the IC-chip 62.

The connector case 80 covering the upper portion of the housing 30 is hermetically connected to the housing 30 via an O-ring 90 by caulking the upper lip of the housing 30. The sensor chip 40, the IC-chip 62 and other electrical connections are contained in a package composed of the housing 30 and the connector case 80 and are protected from outside mechanical forces and humidity. The connector case 80 is made of a material such as PPS (polyphenylene sulfide) having high hydrolysis stability.

Figure 3:
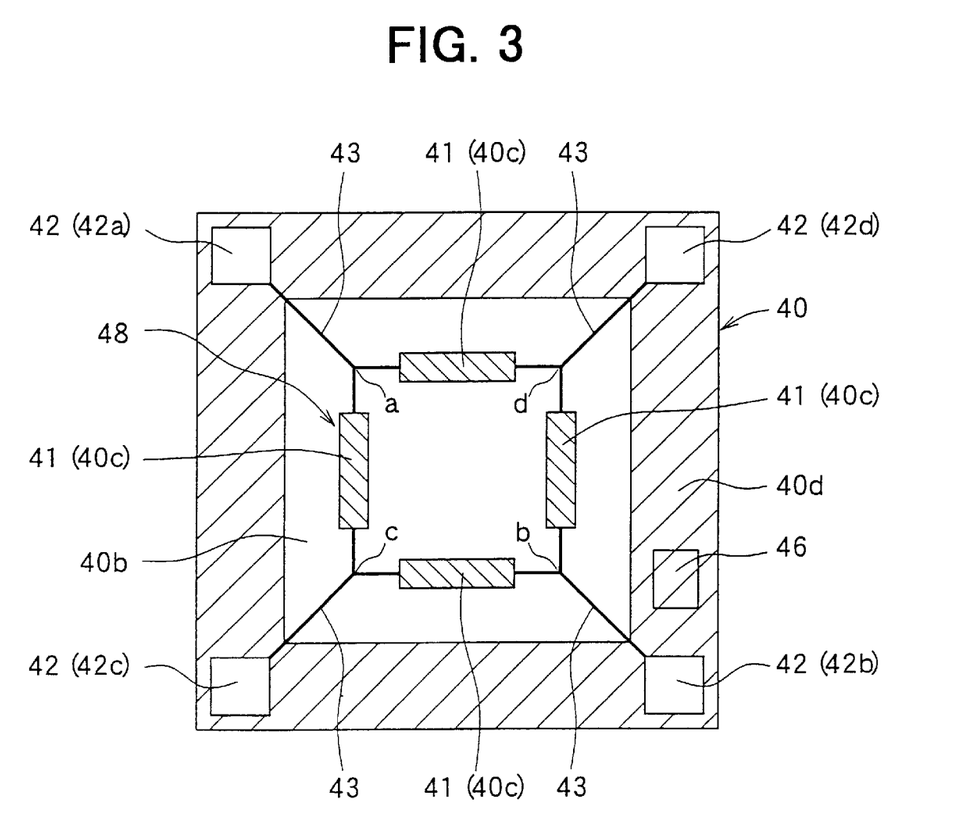
FIG. 3 is a plan view showing the sensor chip in an enlarged scale, viewed from its front surface.
Figure 4:
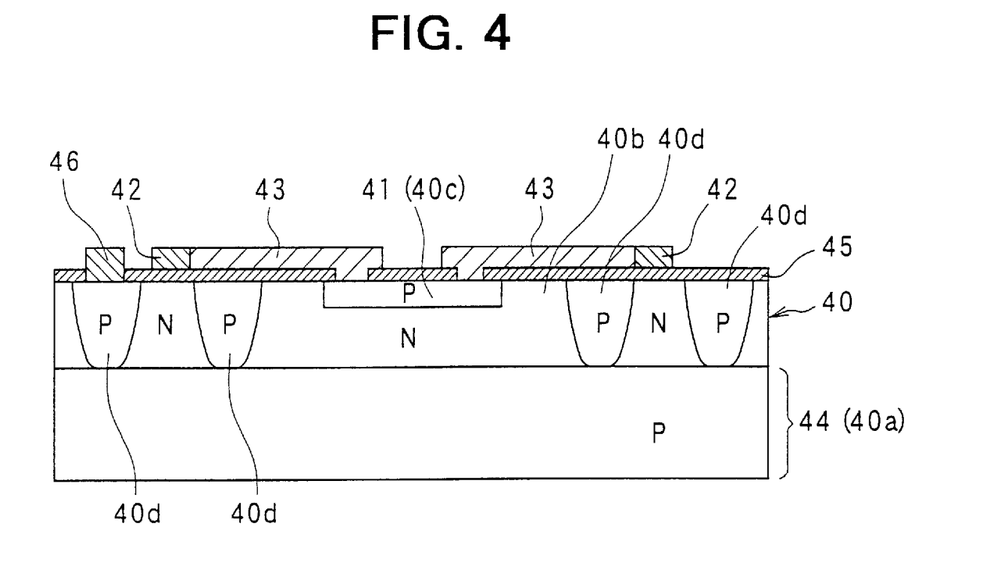
FIG. 4 is a cross-sectional view schematically showing the sensor chip.

Referring to FIGS. 3 and 4, the structure of the sensor chip 40 will be described in detail. FIG. 3 schematically shows a plan view of the sensor chip 40, viewed from a front surface thereof (a surface opposite to its rear surface which contacts the insulation layer 50). FIG. 4 schematically shows a cross-sectional view of the sensor chip 40. Hatching in FIG. 3 is used for differentiating one conduction-type region from another conduction-type region, not for showing cross-sectional areas. The hatched areas designate P-type regions and areas having no hatching designate N-type regions.

As shown in FIG. 3, the strain gage 41 is composed of four strain gage elements connected to form a Wheatstone bridge circuit 48. The bridge circuit 48 converts resistance changes of the strain gage elements caused by distortion of the diaphragm 11 into electrical signals. The four strain gage elements 41 are connected to one another at four points a, b, c and d, as shown in FIG. 3 (also refer to FIG. 6).

As shown in FIG. 4, the sensor chip 40 is made of a silicon semiconductor chip composed of a P-type layer 40a (a first conduction-type layer) and an N-type layer 40b (a second conduction-type layer), both layers being laminated in this order.

Another P-type layer 40c having an impurity density different from that of the P-type layer 40a is formed in the N-type layer 40b, separated from the P-type layer 40a. The P-type layer 40c constitutes the strain gage 41. The P-type layer 40a underneath the N-type layer 40b functions as a shield layer 44. The shield layer 44 positioned between the strain gage 41 and the insulation layer 50 electrically interrupts the strain gage 41 from the metallic stem 10. An oxidized insulation layer 45 is formed on the front surface of the sensor chip 40. Pads 42 for the bridge circuit 48 and wirings 43 are formed on the oxidized insulation layer 45 by vapor deposition of aluminum or the like. The strain gage 41 is electrically connected to the wirings 43 through openings formed on the oxidized insulation layer 45.

Four strain gage elements 41 are connected to form a bridge circuit 48 by the wirings 43, as shown in FIG. 3. The pads 42 for the bridge circuit 48 are electrically connected to points a–d of the bridge circuit 48, respectively, through the wirings 43. Since wire-bonding stress is imposed on the pads 42, the oxidized insulation layer 45 underneath the pads 42 tend to be damaged and electrical isolation of the pads may be broken. To avoid the isolation breakage, P-type regions 40d are formed at positions directly underneath the pads 42, as shown in FIG. 4. A pad 46 for grounding the shield layer 44 is formed on one of the P-type regions 40d. The pad 46 is electrically connected to the shield layer 44 through an opening formed on the oxidized insulation layer 45 and the P-type region 40d.

The pads 42 and 46 are connected to the ceramic substrate 60 through the bonding wires 64, and further connected to the respective terminals 72. The pad 42 positioned at the upper left in FIG. 3 serves as an input pad for supplying a voltage to the bridge circuit 48, while the pad 42 positioned at the bottom right in FIG. 3 serves as a pad for grounding the bridge circuit 48. Two pads 42 positioned at upper right and bottom left in FIG. 3 serve as output pads for outputting the sensor signals. The pad 46 for grounding the shield layer 44 is connected to the ground terminal 72 through a wire separated from the wire connecting the pad 42 for grounding the bridge circuit 48 to the ground terminal 72.

The sensor chip 40 described above is manufactured by known processes that include ion-implantation, thermal dispersion, vapor deposition and so on. The sensor chip 40 is assembled to the pressure sensor S1 in the following manner. The sensor chip 40 is connected to the metallic stem 10 via the insulation layer 50. The metallic stem 10 carrying the sensor chip 40 thereon is inserted into the inner bore of the mounting block 20, and the mounting block 20 is screwed into the housing 30, thereby fixing the metallic stem 10 to the housing 30. Then, the ceramic substrate 60 is pasted on the mounting block 20 and electrically connected to the sensor chip 40 by wire-bonding. Then, the connector terminal 70 is connected to the pin 66 by laser welding such as YAG laser welding. The connector case 80 is fixed to the housing 30 via the O-ring 90 by caulking the upper lip of the housing 30. Thus, the pressure sensor S1 shown in FIG. 1 is completed.

The pressure sensor S1 is connected to the fuel pipe (not shown) by directly screwing the screw 31 formed on the housing 30. The pressure in the fuel pipe is introduced into the metallic stem 10 through the pressure-introducing passage 32 and the opening 12 of the metallic stem 10. The diaphragm 11 is distorted by the introduced pressure, and the diaphragm distortion is converted into electrical signals by the sensor chip 40. The outputs of the sensor chip 40 are fed to the circuits on the ceramic substrate 60 and processed therein. The processed outputs are taken out from the pressure sensor S1 through the output terminal 72 and then fed to the ECU that controls an on-board fuel injection system.

In the sensor chip 40 shown in FIG. 3, an input voltage for the bridge circuit 48 is supplied between the points "a" and "b" of the bridge circuit 48. The point "b" is grounded via the ground terminal 42. The shield layer 44 is grounded via the pad 46. When the diaphragm 11 distorts in response to the pressure supplied thereto, the resistance of the strain gage 41 changes according to the distortion of the diaphragm 11. The output representing the changes in resistance of the strain gage 41 appears between the points "c" and "d" of the bridge circuit 48 as the sensor output voltage. The sensor output voltage is fed to the IC-chip 62 on the ceramic substrate 60, which processes the sensor output voltage. The processed sensor output is taken out form the pressure sensor S1 through the output terminal 72. The electrical connections between the sensor chip 40 and the IC-chip 62, and the output processing in the IC-chip 62 will be further explained later in detail.

Figure 5:
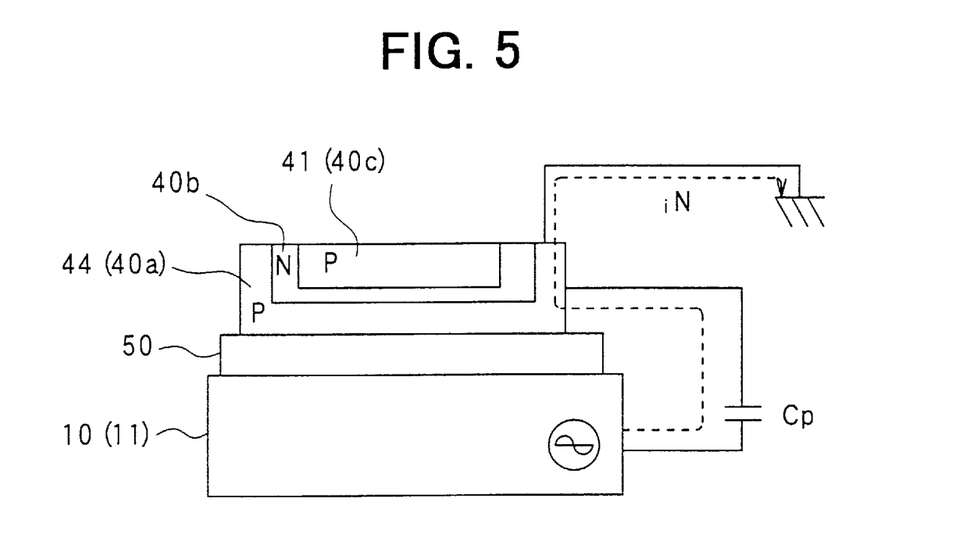
FIG. 5 is a schematic view showing an effect of grounding a parasitic capacitance.

Advantages attained in the foregoing embodiment will be described below. Since the shield layer 44 disposed between the strain gage 41 of the sensor chip 40 and the insulation layer 50 electrically interrupts the strain gage 41 form the metallic stem 10, outside noises otherwise transferred from the housing 30 to the strain gage 41 through the metallic stem 10 are cutout, thereby suppressing influence of the outside noises on the sensor outputs. In other words, the parasitic capacitance Cp formed between the metallic stem 10 and the shield layer 44 of the sensor chip 40 is grounded through the shield layer 44, as shown in FIG. 5. Current iN due to the outside noises is grounded through the shield layer 44, and thereby the strain gages 41 is protected from the outside noises.

If no shield layer 44 is provided as in conventional pressure sensors, a noise current passage is formed through the housing 30, the metallic stem 10, the parasitic capacitance Cp, the sensor chip J40 and the strain gage J41. Since the shield layer 44 is provided according to the present invention, the current iN due to the outside noises is grounded through the following passage: the housing 30, the metallic stem 10, the parasitic capacitance Cp, the shield layer 44, the P-type region 40d, and the pad 46. In this manner, the noise current iN is prevented from entering into the strain gage 41.

Figure 6:
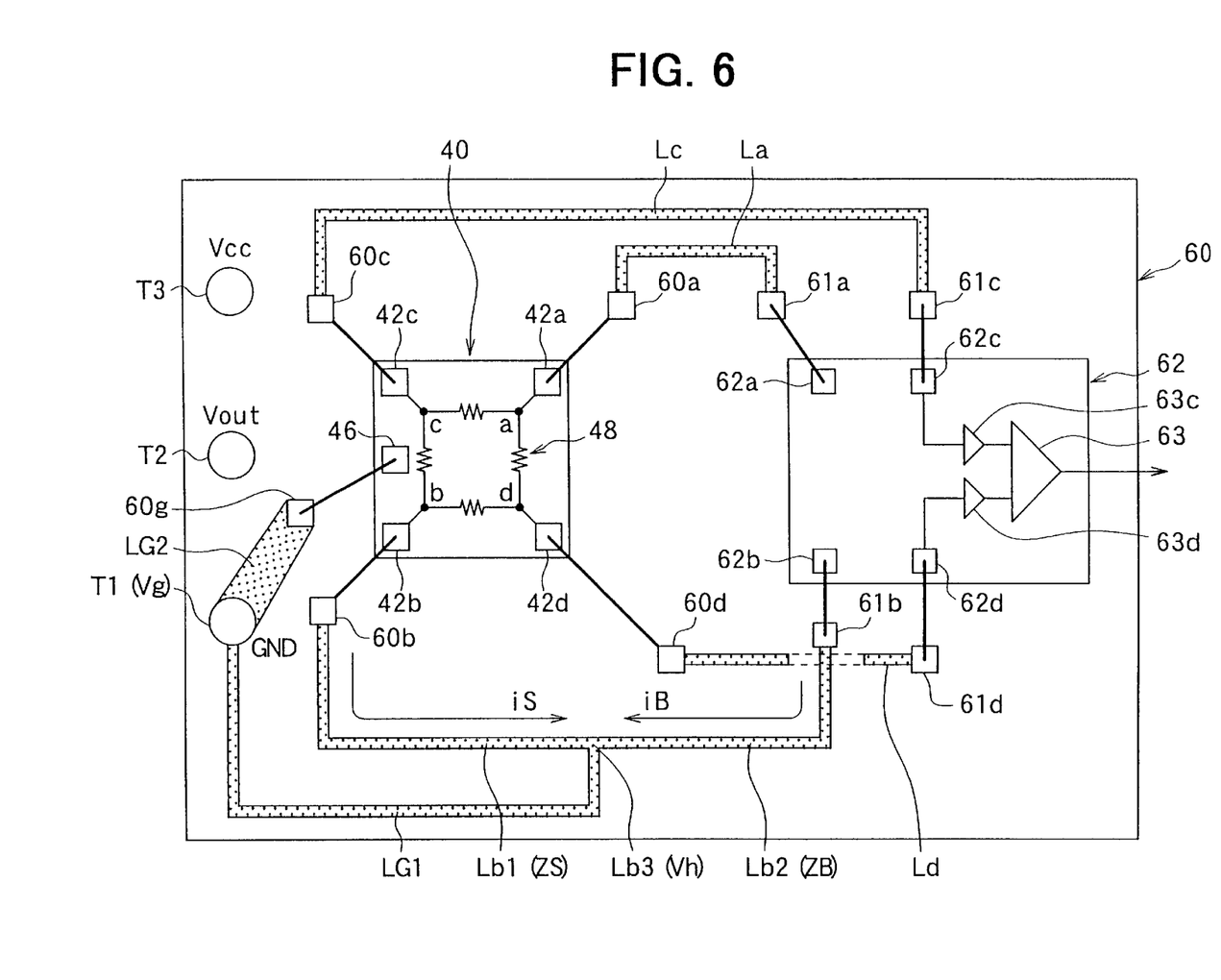
FIG. 6 is a schematic view showing electrical connections in a sensor chip and an amplifier IC-chip, where a shield layer and a bridge circuit are separately grounded.
Figure 7:
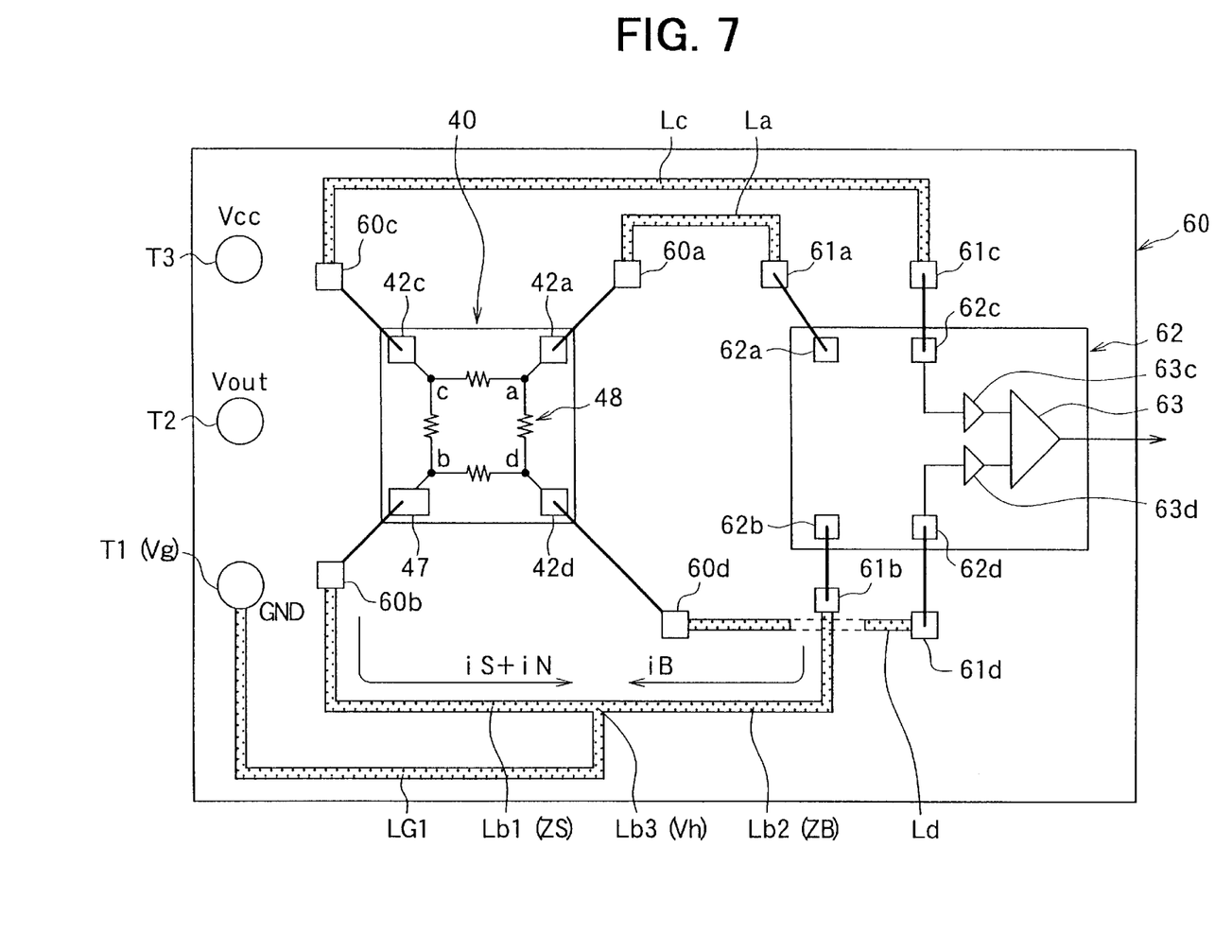
FIG. 7 is a schematic view showing electrical connections in a sensor chip and an amplifier chip, where a shield layer and a bridge circuit are grounded through a common pad.

Further, in the embodiment according to the present invention, the pad 46 for grounding the shield layer 44 is provided separately from the pad 42 for grounding the bridge circuit 48, and both pads 46, 42 are respectively connected to the ground terminal 72 through separate wires. It is possible to use a common pad and a common wire for grounding both the shield layer 44 and the bridge circuit 48. However, when separate pads and wires for grounding the shield layer 44 and the bridge circuit 48, respectively, as in the embodiment described above, the influence of the outside noises on the sensor outputs is surely suppressed. The advantages of the separate grounding in comparison with the common grounding will be explained below in detail with reference to FIGS. 6 and 7. FIG. 6 shows electrical connections in the case where separate ground pads are provided, and FIG. 7 shows those in the case where a common ground pad is provided.

First, referring to FIG. 6, the separate grounding will be explained. A pad 42b positioned close to the pad 46 for grounding the shield layer 44 is used as the pad for grounding the bridge circuit 48. Thick solid lines in FIG. 6 show bonding wires connecting respective pads: i.e., pads 42a–42d and 46 on the sensor chip 40; pads 62a–62d on the amplifier IC-chip 62; and pads 60a–60d, 60g and 61a–61d on the ceramic substrate 60.

The input pad 42a of the sensor chip 40 is connected to the input pad 62a of the amplifier IC-chip 62 through the bonding wire 64, the pad 60a on the ceramic substrate 60, a wire La, the pad 61a and a bonding wire 64. The input pad 62a of the amplifier IC-chip 62 is electrically connected to a junction T3 of the input terminal 72 through a wire (not shown) formed on the ceramic substrate 60. The pad 42b for grounding the bridge circuit 48 is electrically connected to a junction T1 of the ground terminal 72 through the bonding wire 64, the pad 60b on the ceramic substrate 60, a wire Lb1 and a wire LG1.

An output pad 42c of the sensor chip 40 is electrically connected to an output pad 62c of the amplifier IC-chip 62 through the bonding wire 64, the pad 60c on the ceramic substrate 60, a wire Lc, the pad 61c and the bonding wire. Another output pad 42d of the sensor chip 40 is electrically connected to another output pad 62d of the amplifier IC-chip 62 through the bonding wire 64, the pad 60d on the ceramic substrate 60, a wire Ld, the pad 61d, a bonding wire.

On the amplifier IC-chip 62, a first operational amplifier 63c connected to the output pad 62c, a second operational amplifier 63d connected to the output pad 62d, and a differential amplifier 63 connected to both of the first and the second operational amplifiers 63c, 63d are provided. An output from the differential amplifier 63 is sent to a junction T2 of the output terminal 72 through wirings (not shown) formed on the ceramic substrate 60. The pad 62b for grounding the amplifier IC-chip 62 is electrically connected to a junction T1 of the ground terminal 72 through a bonding wire, the pad 61b on the ceramic substrate 60, a wire Lb2 and the wire LG1.

The pad 46 for grounding the shield layer 44 is electrically connected to the junction T1 of the ground terminal 72 through the bonding wire 64, the pad 60g on the ceramic substrate 60 and a wire LG2. The pad 46, as described above, is connected to the ground junction T1 through the wire LG2 which is separate from the wires Lb1 and LG1 connecting the ground pad 42b of the bridge circuit 48 to the ground junction T1. The wire LG2 is made thicker than other wires.

The operation of the pressure sensor will be further explained with reference to FIG. 6. A base potential for operating the bridge circuit 48 and the amplifier IC-chip 62 is Vh which is a potential at a common junction Lb3 of three wires LG1, Lb1 and Lb2. This is because the ground terminal 72 is stably grounded, and a potential Vg at the junction T1 is substantially equal to the potential Vh at the common junction Lb3.

When the pressure sensor is used under an environment where no outside noise is involved, the pressure detection circuit shown in FIG. 6 operates in the following manner. When an input voltage Vcc is supplied between points "a" and "b" of the bridge circuit 48 through the amplifier IC-chip 62, a potential at the pad 60a of the ceramic substrate 60 is Vcc, and a potential at the pad 60b becomes (Vh+ZS·iS), where an impedance of the wire Lb1 is ZS and a current flowing through the wire Lb1 is iS. A potential at the pad 61b of the ceramic substrate 60 becomes (Vh+ZB·iB), where an impedance of the wire Lb2 is ZB and a current flowing through the wire Lb2 is iB. Potentials Vg, Vh and impedances ZS, ZB are shown in FIG. 6 in parentheses after the corresponding reference numbers.

Upon supplying the input voltage Vcc, the resistance change in the strain gage 41 corresponding to the distortion of the diaphragm 11 appears as an output voltage between points "c" and "d" of the bridge circuit 48. The output voltage (VS1+Vh) fed to the pad 62c of the amplifier IC-chip 62 is amplified by the first operational amplifier 63c, and the output voltage (VS2+Vh) fed to the pad 62d of the amplifier IC-chip 62 is amplified by the second operational amplifier 63d. A difference between both amplified voltages is amplified by the differential amplifier 63. The output of the differential amplifier 63 is led to the output terminal 72 as a sensor output.

On the other hand, when the pressure sensor is used under an environment where outside noises are involved, the pressure detection circuit shown in FIG. 6 operates in the following manner. A noise current transferred from the housing 30 to the sensor chip 40 through the metallic stem 10 and the parasitic capacitance Cp is led to the ground terminal 72 through the shield layer 44 of the sensor chip 40, the P-type region 40d, the pad 46 for grounding the shield layer, the pad 60g on the ceramic substrate 60, and the wire LG2. In other words, the noise current passage is separated from the detection circuit.

In addition, the grounding by the ground terminal 72 is stable, and the potential Vh at the junction Lb3, which is the base potential in the detecting operation, is also stable. Therefore, all of the following potentials are not affected by the noise current if outside noises enter into the pressure sensor: the potential Vcc at the pad 60a of the ceramic substrate 60, the potential (Vh+ZS·iS) at the pad 60b, the potential (Vh+ZB·iB) at the pad 61b, the potential (VS1+Vh) at the pad 62c of the amplifier IC-chip 62, and the potential (VS2+Vh) at the pad 62d of the amplifier IC-chip 62. Accordingly, the influence of the outside noises on the sensor output is eliminated by separating the pad 46 for grounding the shield layer 44 from the pad 42b for grounding the bridge circuit 48 and by separating both of the grounding circuits.

For comparing the separate grounding system described above with the common grounding system, the operation of the common grounding system will be described with reference to FIG. 7. In FIG. 7, the pad 46 for grounding the shield layer 44 and the grounding wire LG2 are eliminated, and a pad 47 is used as a common pad for grounding the shield layer 44 and the bridge circuit 48. The common grounding pad 47 is electrically connected to the shield layer 44 through the P-type region 40d. Further, the common grounding pad 47 is electrically connected to the junction T1 of the ground terminal 72 through the bonding wire 64, the pad 60b on the ceramic substrate 60 and the wires Lb1, LG1. Other structures of the circuit shown in FIG. 7 are identical to those shown in FIG. 6.

Under the no noise environment, the circuit shown in FIG. 7 operates in the same manner as in the circuit shown in FIG. 6. That is, the following potentials in the circuit shown in FIG. 7 are the same as those in the circuit shown in FIG. 6: the potential Vcc at the pad 60a of the ceramic substrate 60, the potential (Vh+ZS·iS) at the pad 60b, the potential (Vh+ZB·iB) at the pad 61b, the potential (VS1+Vh) at the output pad 62c of the amplifier IC-chip 62, and the potential (VS2+Vh) at the output pad 62d of the amplifier IC-chip 62.

Under the environment where the outside noises are involved, the noise current transferred to the sensor chip 40 is led to the ground through the shield layer 44 of the sensor chip 40, the P-type region 40d, the common grounding pad 47, the pad 60b of the ceramic substrate 60, the wires Lb1, LG1, and the ground terminal 72. It seems that the noise current is prevented from entering the bridge circuit 48 in this manner. However, the sensor output is actually affected by the outside noises for the reason described below.

Assuming that an amount of the noise current led to the ground through the common grounding pad 47 is iN, a potential at the pad 60b, which is the ground potential of the bridge circuit 48, becomes (Vh+ZS·iS+ZS·iN), though the potential Vcc at the pad 60a of the ceramic substrate 60 and the potential (Vh+ZB·iB) at the pad 61b are kept unchanged. That is, a potential change (ZS·iN) due to the noise current iN is added to the ground potential of the bridge circuit 48. Therefore, the potentials at the pads 62c and 62d of the amplifier IC-chip 62 become (VS1+Vh+ZS·iN) and (VS2+Vh+ZS·iN), respectively.

Figure 8:
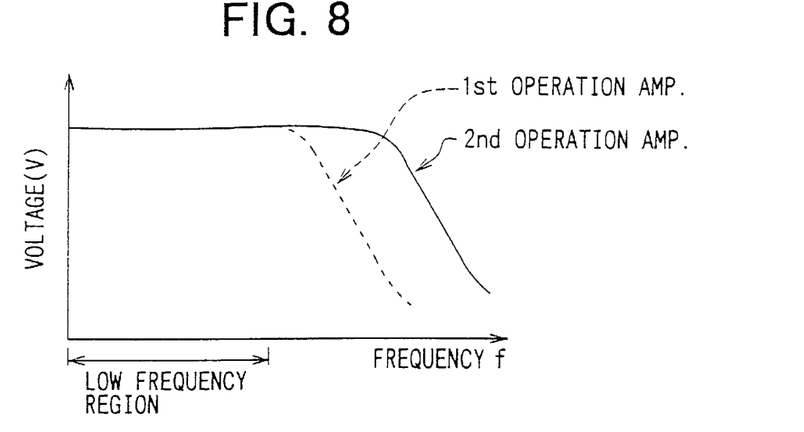
FIG. 8 is a graph showing frequency characteristics of first and second operational amplifiers.

The first and the second operational amplifiers 63c and 63d have frequency characteristics as shown in FIG. 8. Usually, both frequency characteristics are not equal in a high frequency region although they are equal in a low frequency region. Therefore, in a low frequency region (e.g., in a several KHz region), the noise voltage (ZS·iN) is canceled by taking a difference between both outputs from the first and the second operational amplifiers 63c, 63d. However, in a high frequency region (e.g., in a MHz region), the noise voltage is not canceled. As a result, high frequency noises are superimposed on the sensor outputs.

To eliminate the high frequency noises, it is effective to employ the separate grounding system as in the embodiment described above (i.e., the system in which the pad 46 for grounding the shield layer 44 and the pad 42b for grounding the bridge circuit 48 are separately provided, and both pads are connected to the ground terminal 72 through separate circuits).

Figure 9A:
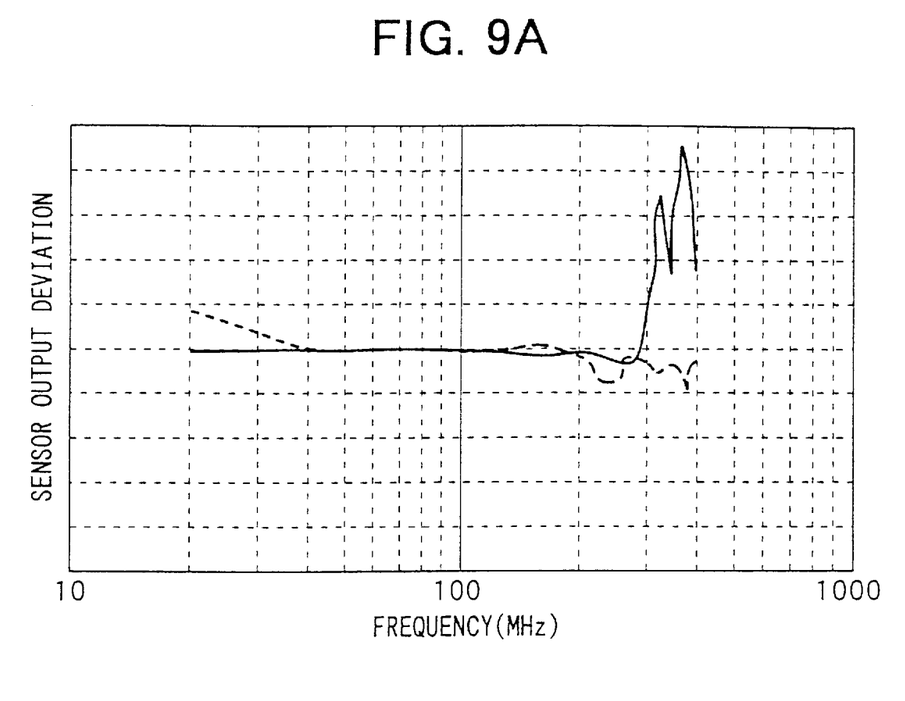
FIG. 9A is a graph showing a sensor output deviation due to outside noises.
Figure 9B:
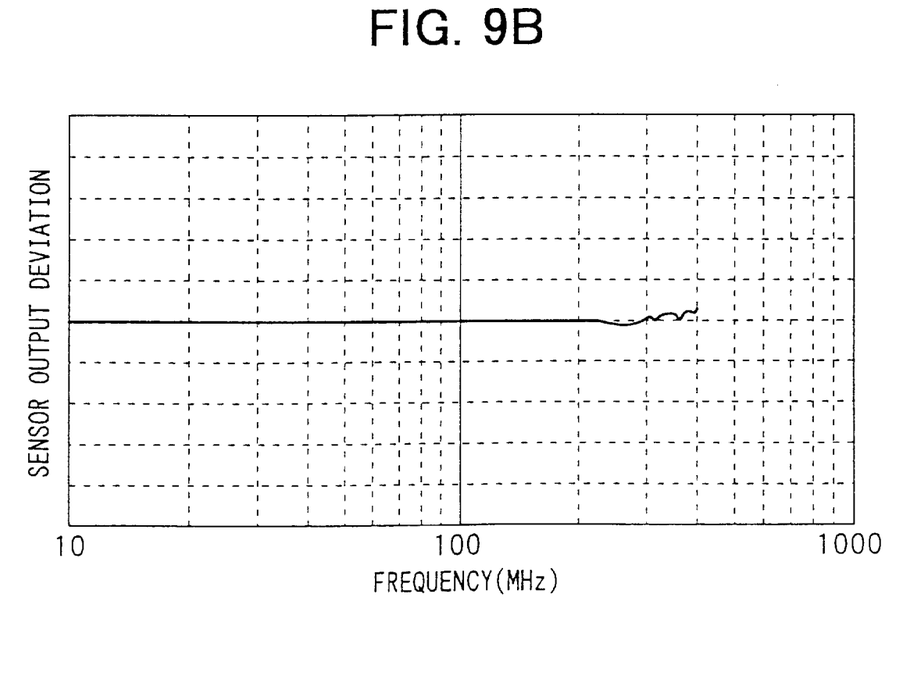
FIG. 9B is a graph showing a sensor output deviation due to outside noises, where a shield layer and a bridge circuit are separately grounded.

Tests for comparing the separate grounding system with the common grounding system have been conducted, and the test results are shown in FIGS. 9A and 9B. The tests were conducted under the environment in which electromagnetic noises of 200V/m are involved, and sensor output deviations due to the noises are plotted, while changing the noise frequency. The sensor output deviation means a sensor output difference between the sensor output under no noise environment and the sensor output under the environment in which the noises are involved.

In FIG. 9A, the sensor output deviation in a conventional pressure sensor having no shield layer is plotted with a broken line, while the sensor output deviation in a pressure sensor that includes the shield layer 44 and employs the common grounding system with a solid line. As seen in the graph of FIG. 9A, the influence of the noises is suppressed in a low frequency region (several tens MHz) by providing the shield layer 44 grounded commonly with the bridge circuit 48. However, the noise influence is not suppressed in a high frequency region (several hundreds MHz).

In FIG. 9B, the sensor output deviation in the pressure sensor, in which the shield layer 44 is provided and the separate grounding system is employed as in the embodiment described above, is shown. As seen in the graph of FIG. 9B, the influence of the noises on the sensor output is suppressed throughout all the frequency regions.

Figure 10:
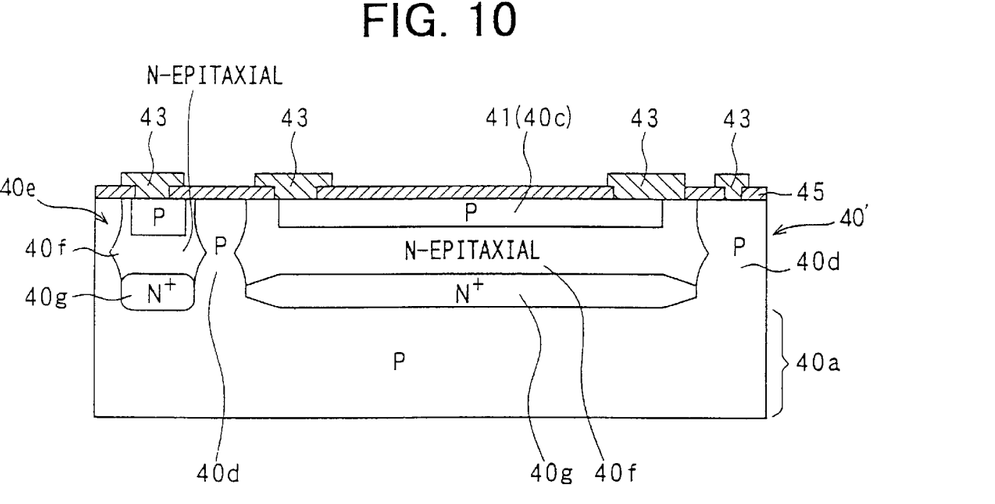
FIG. 10 is a cross-sectional view showing a modified form of the sensor chip.

The sensor chip 40 described above may be modified to a sensor chip 40' shown in FIG. 10. In this sensor chip 40', semiconductor elements for processing sensor signals are integrated into one chip together with the sensor elements. The signal processor elements are formed in a processor region 40e which is separated from the region 40c having the strain gage 41 by the P-type region 40d (a P-type isolation region). In this integrated chip, an N-type epitaxial region 40f is formed as a region having a low impurity density for forming processor elements therein. An embedded N$^+$ region 40g is formed as a region having a high impurity density ($1\times10^{18}/cm^{-3}$) to prevent a depletion layer in the N-type epitaxial region 40f from reaching the P-type layer 40a.

Though the sensor chip 40 is made on the semiconductor substrate having a P-type layer as a base layer (a first layer) and an N-type layer (a second layer) formed on the base layer, positions of the P-type and the N-type layers may be reversed. That is, an N-type layer may be the first layer and a P-type layer may be the second layer. Though the semiconductor substrate is used to form the sensor elements in the foregoing embodiment, the sensor elements may be made on a silicon layer formed by vapor deposition on the diaphragm 11 of the metallic stem 10. In this case, an oxidized film interposed between the silicon layer and the diaphragm is used as an insulation layer.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A pressure sensor comprising:
    a metallic stem having a diaphragm for sensing a pressure applied thereto, the metallic stem being contained in a housing;
    a semiconductor sensor chip mounted on a front surface of the diaphragm with an insulation layer interposed therebetween;
    a strain gage for converting distortion of the diaphragm caused by the pressure applied thereto into an electrical signal, the strain gage being formed on the semiconductor sensor chip; and
    a grounded shield layer for electrically interrupting the strain gage from the metallic stem that is interposed between the strain gage and insulation layer, wherein:

the semiconductor sensor chip comprises a silicon semiconductor chip having a first-type conduction layer contacting the insulation layer and a second-type conduction layer formed on the first-type conduction layer;

the first-type conduction layer functions as the grounded shield layer; and the strain gage is formed by a first-type conduction region formed in the second-type conduction layer and separated from the first-type conduction layer.

2. The pressure sensor as in claim 1, wherein:

the strain gage is composed of a plurality of strain gage elements forming a bridge circuit that converts resistance changes of the strain gage elements caused by the distortion of the diaphragm into an electrical signal;

the semiconductor sensor chip includes a pad for grounding the grounded shield layer and another pad for grounding the bridge circuit, both pads being formed separately from each other; and both of the pads are grounded through respective circuits formed separately from each other.

3. The pressure sensor as in claim 1, wherein:

the first-type conduction layer is a P-type conduction layer and the second-type conduction layer is an N-type conduction layer.

4. The pressure sensor as in claim 1, wherein the semiconductor sensor chip includes a pad for grounding the grounded shield layer, the pad being electrically connected to the grounded shield layer by another first-type conduction region.

5. The pressure sensor as in claim 4, wherein the grounded shield layer provides a passage to ground for noise current to divert the noise current away from the strain gage.

\* \* \* \* \*